United States Patent
Yasuhara et al.

(10) Patent No.: US 11,040,370 B2
(45) Date of Patent: Jun. 22, 2021

(54) SLURRY APPLICATION METHOD AND SLURRY APPLICATION DEVICE

(71) Applicant: JFE STEEL CORPORATION, Tokyo (JP)

(72) Inventors: Satoki Yasuhara, Tokyo (JP); Hirokazu Kobayashi, Tokyo (JP); Yuhei Iwami, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 92 days.

(21) Appl. No.: 16/487,956

(22) PCT Filed: Feb. 27, 2018

(86) PCT No.: PCT/JP2018/007329
§ 371 (c)(1),
(2) Date: Aug. 22, 2019

(87) PCT Pub. No.: WO2018/159633
PCT Pub. Date: Sep. 7, 2018

(65) Prior Publication Data
US 2020/0038905 A1 Feb. 6, 2020

(30) Foreign Application Priority Data

Feb. 28, 2017 (JP) .............................. JP2017-037491

(51) Int. Cl.
*B05C 1/08* (2006.01)
*B05D 1/02* (2006.01)
(Continued)

(52) U.S. Cl.
CPC .............. *B05D 1/28* (2013.01); *B05C 1/0813* (2013.01); *B05D 1/02* (2013.01); *B05D 7/24* (2013.01)

(58) Field of Classification Search
CPC ... B05D 1/02; B05D 1/28; B05D 3/00; B05D 7/00; B05D 7/24; B05C 1/08; B05C 1/0813; B05C 11/025; B05B 13/0278
See application file for complete search history.

(56) References Cited

U.S. PATENT DOCUMENTS

| 5,967,881 A | 10/1999 | Tucker |
| 10,118,194 B2 | 11/2018 | Kobayashi et al. |

FOREIGN PATENT DOCUMENTS

| CN | 102407120 A | 4/2012 |
| CN | 102407210 B | 10/2013 |

(Continued)

OTHER PUBLICATIONS

Dec. 9, 2019, the Extended European Search Report issued by the European Patent Office in the corresponding European Patent Application No. 18760252.9.

(Continued)

*Primary Examiner* — Alexander M Weddle
(74) *Attorney, Agent, or Firm* — Kenja IP Law PC

(57) ABSTRACT

Adhesion of particles having a large particle size contained in the slurry to a surface of a strip member is suppressed. A slurry application method includes: spraying a slurry from a nozzle onto one or both of a traveling strip member and a roll; and applying the slurry to a surface of the strip member by pressing the roll against the surface of the strip member, wherein a spray angle $\theta$ is set to 0° or more and 50° or less, a distance d in a conveyance direction of the strip member between an intersection point P1 and a rotation center P2 of the roll is 100 mm or less, and a height h from the surface of the strip member to the intersection point P1 is ½ or less of a diameter of the roll.

5 Claims, 5 Drawing Sheets

(51) Int. Cl.
      *B05D 1/28*    (2006.01)
      *B05D 7/24*    (2006.01)

(56)            References Cited

FOREIGN PATENT DOCUMENTS

| EP | 2848319 A1 | | 3/2015 |
|---|---|---|---|
| EP | 3189900 A1 | | 7/2017 |
| EP | 2848319 B1 | | 12/2018 |
| JP | S6271575 A | | 4/1987 |
| JP | S637385 A | | 1/1988 |
| JP | H06190322 A | | 7/1994 |
| JP | H08283866 A | | 10/1996 |
| JP | H11350152 A | | 12/1999 |
| JP | 2000512919 A | | 10/2000 |
| JP | 2001335998 A | | 12/2001 |
| JP | 2001335998 A | * | 12/2001 |
| JP | 2004057971 A | | 2/2004 |
| JP | 2013180270 A | | 9/2013 |
| JP | 2013188743 A | | 9/2013 |
| JP | 2013253320 A | | 12/2013 |
| WO | 2016035825 A1 | | 3/2016 |

OTHER PUBLICATIONS

Jun. 18, 2019, Notification of Reasons for Refusal issued by the Japan Patent Office in the corresponding Japanese Patent Application No. 2017-037491 with English language Concise Statement of Relevance.
May 15, 2018, International Search Report issued in the International Patent Application No. PCT/JP2018/007329.

* cited by examiner

SLURRY APPLICATION METHOD AND SLURRY APPLICATION DEVICE

TECHNICAL FIELD

This disclosure relates to a slurry application method for applying a slurry to the surface of a traveling strip member. This disclosure also relates to a slurry application device for applying a slurry to the surface of a traveling strip member.

BACKGROUND

In order to provide a steel sheet with performances such as corrosion resistance, workability, designability, insulating properties, and adhesion, it is widely practiced to apply various coating solutions to the surface of the steel sheet to form a coating.

One of the devices for applying a coating solution is a roll coater. Among them, a 3-roll coater using three rolls is known to be excellent in controllability of the coating layer thickness and to have a relatively aesthetic surface appearance.

However, the increase in the number of rolls complicates maintenance and operation management, resulting in high production costs. Therefore, in order to simply carry out surface treatment, a horizontal-pass-squeeze-coater method is used in which a coating solution is supplied from the nozzle to the substrate and the substrate is squeezed with a pair of rolls.

However, there has been a problem that coating defects are likely to occur when a slurry in which water and solids are mixed is applied using a squeeze coater in a horizontal pass. The reason is that as large particles tend to settle, a large number of coarse particles having a diameter of 10 μm or more adhere to the upper surface of the substrate and slip through the region directly below the rolls. Since unevenness occurs during coating and drying in the portion to which the coarse particles are adhered, the portion to which a large number of coarse particles are attached turns into a defect with poor appearance and characteristics.

Therefore, various methods for uniformly applying slurry have been proposed.

For example, JPH11-350152A (PTL 1) proposes a method for making the slurry application amount uniform by, when applying a slurry to a steel sheet surface using multiple spray nozzles, adjusting the distance between the spray nozzles, the distance between the steel sheet and the nozzles, and the spraying angle to the steel sheet.

JP2013-180270A (PTL 2) proposes, in order to reduce streak-like coating unevenness generated in the longitudinal direction of the substrate, supplying a slurry to a surface of a substrate, then spraying a gas to the substrate using a nozzle, and then pressing a roll on the surface of the substrate. In this method, the excess slurry is removed by spraying a gas to adjust the coating layer thickness, and then poor appearance due to scattering of the slurry is leveled by the rolls.

JPH8-283866A (PTL 3) proposes a measure against particle adhesion, including controlling the wetting and spreading of a liquid coating layer formed on the roll coater entry side to 250 mm or less by slurry or gas spraying.

CITATION LIST

Patent Literature

PTL 1: JPH11-350152A
PTL 2: JP2013-180270A
PTL 3: JPH8-283866A

SUMMARY

Technical Problem

However, in the methods proposed in PTLs 1 and 2, attention is not paid to the problem of adhesion of coarse particles contained in the slurry to the surface of the substrate, and the above problems remain to be solved.

In addition, normally, when a coating solution carried along with the traveling substrate collides with the rolls, such a flow is generated that winds up the particles settled in the vicinity of the surface of the substrate. This flow becomes weak, however, when the conveyance speed of the substrate is as slow as is 40 m/min or less. Therefore, by means of the method proposed in PTL 3 alone, adhesion of coarse particles to the substrate can not be sufficiently suppressed.

The present disclosure was made in view of the above situation. It would thus be helpful to suppress, when applying a slurry with a roll coater, adhesion of particles having a large particle size contained in the slurry to the surface of the substrate.

Solution to Problem

The inventors discovered that when applying a slurry to a substrate of a traveling strip member, by controlling the spray angle of the slurry and the slurry supply position within a specific range, adhesion of particles having a large particle size contained in the slurry to the substrate can be suppressed, and the present disclosure was completed.

The present disclosure is based on the above discovery and the primary features thereof are as follows.

1. A slurry application method comprising: spraying a slurry from a nozzle onto one or both of a traveling strip member and a roll; and applying the slurry to a surface of the strip member by pressing the roll against the surface of the strip member, wherein a spray angle θ defined as an angle between a plane horizontal to the strip member and the spray direction of the nozzle is set to 0° or more and 50° or less, a distance d in a conveyance direction of the strip member between an intersection point P1 and a rotation center P2 of the roll is 100 mm or less, the intersection point P1 being closest to the nozzle among an intersection point between a straight line extending in a spray direction of the nozzle and the surface of the strip member and an intersection point between the straight line extending in the spray direction of the nozzle and a surface of the roll, and a height h from the surface of the strip member to the intersection point P1 is ½ or less of a diameter of the roll.

2. The slurry application method according to 1., wherein a flow rate of the slurry per 1 m of a width of the strip member is 35 L/min/m or more.

3. The slurry application method according to 1. or 2., wherein a traveling speed of the strip member is 40 m/min or less.

4. A slurry application device which sprays a slurry from a nozzle onto one or both of a traveling strip member and a roll, and applies the slurry to a surface of the strip member by pressing the roll against the surface of the strip member, wherein a spray angle θ is 0° or more and 50° or less, the spray angle being defined as an angle formed by a plane horizontal to the strip member and a spray direction of the nozzle, a distance d in a conveyance direction of the strip member between an intersection point P1 and a rotation center P2 of the roll is 100 mm or less, the intersection point P1 being closest to the nozzle among an intersection point between a straight line extending in a spray direction of the nozzle and the surface of the strip member and an intersection point between the straight line extending in the spray direction of the nozzle and a surface of the roll, and a height h from the surface of the strip member to the intersection point P1 is ½ or less of a diameter of the roll.

Advantageous Effect

According to the present disclosure, when applying a slurry with a roll coater, it is possible to suppress adhesion of particles having a large particle size contained in a slurry to a surface of a strip member.

BRIEF DESCRIPTION OF THE DRAWINGS

In the accompanying drawings.

DETAILED DESCRIPTION

Hereinafter, the details of the slurry application method according to the disclosure will be described. Note that the following description is for describing some preferred embodiments of the disclosure, and the disclosure is not limited to the embodiments disclosed herein.

Figure 1:
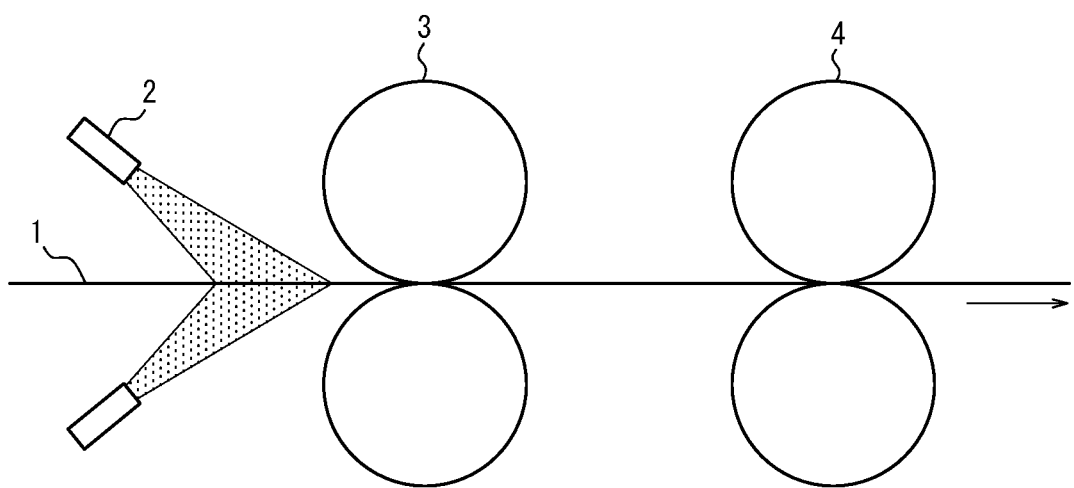
FIG. 1 is a schematic view of slurry application with a squeeze coater.

One of the embodiments of the disclosure is implemented by a squeeze coater application method in a horizontal pass, whereby, as illustrated in FIG. 1, a slurry (coating solution) is sprayed from a nozzle 2 onto both front and rear surfaces of a strip member 1 and the excess liquid is squeezed by rolls 3 and 4. In the method of FIG. 1, the slurry is squeezed twice by the rolls 3 and 4. The coating layer thickness is adjusted slightly thick by the preceding roll 3, and squeezed again in the subsequent pass to adjust the coating layer thickness to a predetermined level. This adjustment can stabilize the meniscus on the exit side of the succeeding roll 4 to suppress streak-like defects. Alternatively, only the roll 3 may be disposed at the preceding stage, and the slurry may be squeezed only once.

[Strip Member]
The material of the strip member is not particularly limited, and any strip-shaped material is applicable. The strip member may be, for example, a strip member made of metal, resin, or paper. In one embodiment, the strip member is a steel strip, yet may be another metal sheet such as a sheet made of another metal such as aluminum, a paper sheet, a resin film, or the like.

[Slurry]
The slurry used as the coating solution is a mixture of a liquid and particles. As the liquid, water, an organic solvent, or a mixture of both is usable. As the particles, any particles are usable, yet in one embodiment inorganic particles are used. Examples of the inorganic particles include magnesium oxide powder, nickel powder, silica powder, and alumina powder.

For example, magnesium oxide may be mixed with water to form a slurry, which can be applied to a surface of a steel sheet. The slurry is usable, for example, as an annealing separator.

The present disclosure is applicable to a slurry containing particles of any particle size, yet the effect obtained is greater as the slurry containing particles having a larger particle size is used. Therefore, the present disclosure is preferably applied particularly when using a slurry containing particles having a particle diameter of 5 μm or more, and more preferably applied when using a slurry containing particles having a particle diameter of 10 μm or more.

[Nozzle]
The shape of the nozzle is not particularly limited as long as it can spray the slurry. Examples of the nozzle include a fan-shaped nozzle, a slit nozzle, and a conical nozzle. The slurry may be sprayed from the nozzle 2 as described above in accordance with a general method.

The number of nozzles is not limited, and may be one or more. In the case of spraying the slurry on both front and rear surfaces of the strip member, at least one is installed on each surface. Preferably, on each of the front and rear surface sides of the strip member, a number of nozzles corresponding to the width of the strip member are installed, or a nozzle having a number of nozzle holes corresponding to the width of the strip member is installed. In the case of installing a plurality of nozzles or a nozzle having a plurality of nozzle holes, the pitch of the nozzles or the nozzle holes in the width direction of the strip member is preferably 250 mm or less in order to apply the slurry uniformly in the width direction. In order to secure the strength of the nozzle(s), the pitch is more preferably set to 5 times or more of the nozzle diameter and 250 mm or less. From the viewpoint of suppressing the clogging by the slurry, the diameter of the discharge port (orifice diameter) of the nozzle is preferably 3 mm or more.

[Roll]
The material of the roll is not particularly limited, and any material is usable. However, from the viewpoint of coating uniformity, it is preferable that the surface of the roll is made of rubber or elastomer. As the rubber or elastomer, a material having excellent wear resistance is preferably used, and for example, one or more selected from the group consisting of urethane rubber, nitrile rubber, and chlorosulfonated polyethylene is preferably used. The Shore hardness of the roll surface is preferably A45° to A85°.

Although the structure of the roll is not particularly limited, it is preferable to provide a lining made of rubber or elastomer on the surface of a metal roll.

When the roll diameter is large, the roll circumferential length becomes long accordingly, and the wear per unit area decreases and the roll lifetime is elongated. Therefore, the roll diameter is preferably 50 mm or more. On the other hand, if the diameter of the roll is reduced, the amount of the coating solution staying on the meniscus between the roll and the strip member on the roll exit side is reduced accordingly, and as a result, the occurrence of streak-like coating defects can be further suppressed. Therefore, the roll diameter is preferably 400 mm or less, and more preferably 300 mm or less.

Groove may be engraved on the roll from the viewpoint of securing the coating layer thickness. The arrangement of the grooves is not particularly limited, yet it is preferable to provide linear grooves extending in the circumferential direction of the roll on the outer periphery of the roll. It is preferable that the grooves be arranged around the outer periphery of the roll. It is also preferable that the grooves be provided at intervals in the axial direction of the roll. The distance is not particularly limited, yet preferably 0.01 mm to 1 mm. The groove size is not particularly limited, yet if the grooves are too large, particles may easily slip through the roll, causing coating defects. Therefore, the cross-sectional area of each groove is preferably 10 $mm^2/m$ to 400 $mm^2/m$.

The roll rotation direction is not particularly limited, and may be selected depending on the application. When the roll rotation direction is reverse to the traveling direction of the strip member, the coating solution staying on the meniscus on the roll exit side can be stabilized to suppress the occurrence of streak-like defects. In application of a slurry containing hard particles such as ceramic particles, however, the hard particles play a role of an abrasive, shortening the roll lifetime. By making the roll rotation direction the same as the traveling direction of the strip member 1, the roll lifetime can be extended.

[Slurry Spray Angle and Slurry Supply Position]

In order to prevent coarse particles from adhering to the surface of the strip member, it is preferable to spray the slurry as close to the contact portion between the roll and the strip member as possible. When the slurry supply position is far from the roll, the coarse particles wound up by the slurry spraying would settle again, making it impossible to prevent the adhesion of coarse particles to the strip member. A shallower angle between a straight line extending in the spray direction and the strip member is preferable, and can strengthen the flow of winding up the settled particles.

Figure 2:
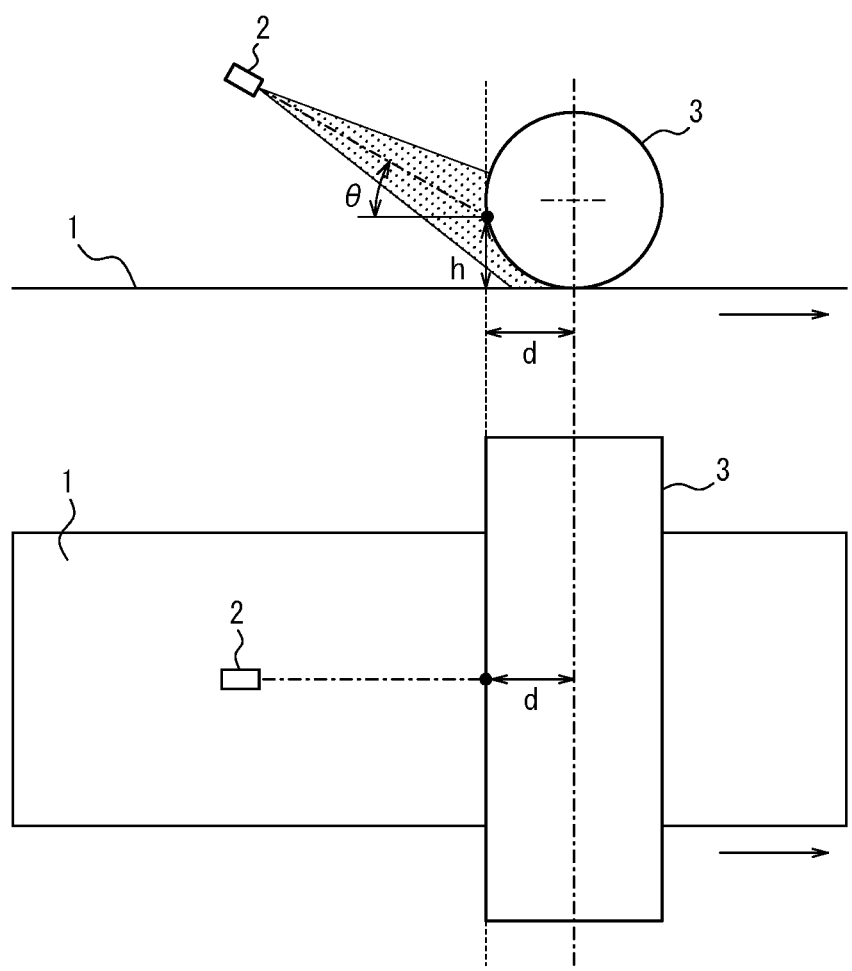
FIG. 2 is a schematic view of slurry application with a squeeze coater.
Figure 3:
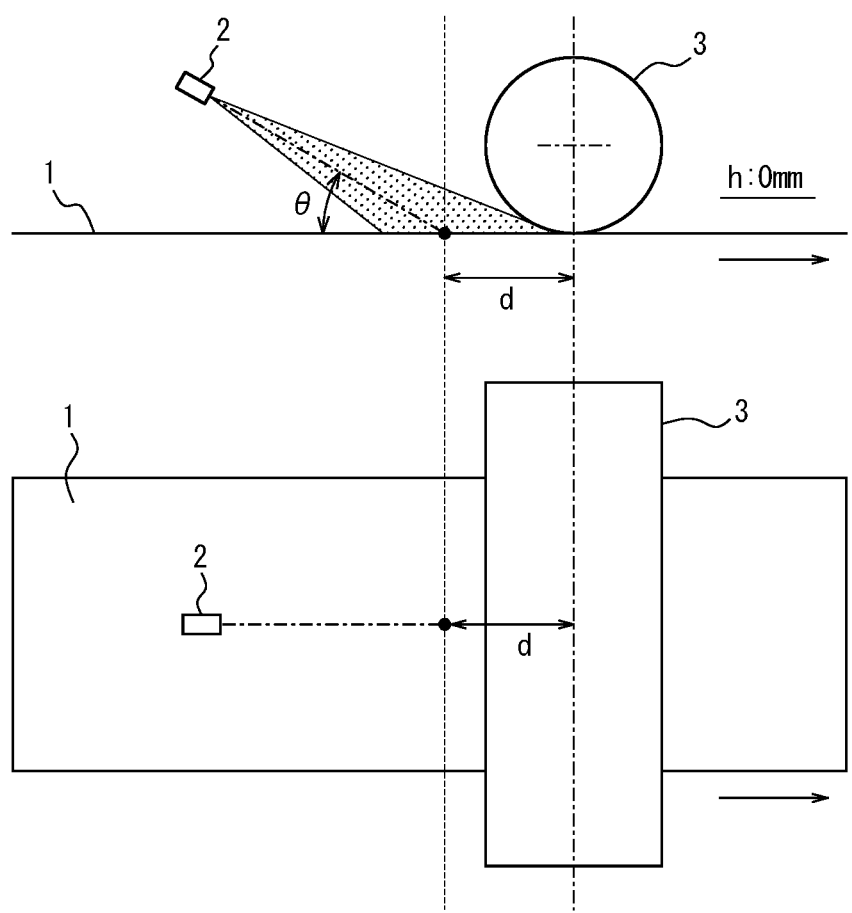
FIG. 3 is a schematic view of slurry application with a squeeze coater.

Therefore, the "spray angle θ", the "distance d", and the "height h" illustrated in FIGS. 2 and 3 are controlled as described below.

Spray angle θ: 0° or more and 50° or less

As described above, when the spray angle θ is too large, the flow of winding up coarse particles becomes insufficient, making it impossible to prevent coarse particles from adhering to the surface of the strip member. Therefore, the spray angle θ is 50° or less, and preferably 40° or less. On the other hand, the smaller the spray angle θ, the stronger the flow of winding up coarse particles. Therefore, the lower limit for the spray angle θ is 0°. In the case where the spray height is 0 mm, if the spray angle is set to 0°, the nozzle and the strip member contact each other. Therefore, the spray angle θ is preferably 5° or more.

As used herein, the "spray angle θ" is defined as the angle between a plane horizontal to the strip member and the spray direction of the nozzle.

Distance d: 100 mm or less

As described above, when the slurry supply position is far from the roll, coarse particles wound up by the slurry spraying settle again, making it impossible to prevent the adhesion of coarse particles to the strip member. Therefore, the distance d is set to 100 mm or less. As used herein, the "distance d" is defined as the distance in a conveyance direction of the strip member between an intersection point P1 and a rotation center P2 of the roll, the intersection point P1 being closest to the nozzle among an intersection point between a straight line extending in a spray direction of the nozzle and the surface of the strip member and an intersection point between the straight line extending in the spray direction of the nozzle and a surface of the roll.

On the other hand, the lower limit for the distance d is not particularly limited. However, although the method of spraying the slurry in the vicinity of the contact portion between the roll and the strip member is effective for reducing coarse particles, air bubbles in the slurry slip through immediately below the roll to disturb the flow at the meniscus on the roll exit side, which may cause streak-like application defects. Therefore, from the viewpoint of further suppressing streak-like defects, the distance d is preferably set to 20 mm or more.

Height h: ½ or less of the roll diameter

If the height h is larger than ½ of the roll diameter, the sprayed slurry is blocked by the roll, the flow rate of the slurry is reduced, and the flow of winding up the settled particles is weakened, making it impossible to suppress the adhesion of coarse particles. Therefore, the height h is set to ½ or less, preferably ⅓ or less, of the diameter of the roll. On the other hand, the lower limit for the height h is not particularly limited, and may be zero. As used herein, the "height h" is defined as the height from the surface of the strip member to the intersection point P1.

[Slurry Flow Rate]

By accelerating the flow of the slurry on the roll entry side, it is possible to wind up the particles which have settled in the vicinity of the strip member. Therefore, the slurry flow rate is preferably set to 35 L/min/m or more per 1 m (per unit width) in the width direction of the strip member 1. However, if the flow rate is excessively increased, the liquid scattering on the roll entry side becomes intense. Therefore, it is preferable to set the slurry flow rate to 400 L/min/m or less per 1 m (per unit width) in the width direction of the strip member 1. As used herein, the "slurry flow rate" refers to the flow rate at which the slurry is sprayed from the nozzle and reaches the strip member.

[Traveling Speed]

The traveling speed (conveyance speed) of the strip member is not particularly limited. However, if the traveling speed becomes 40 m/min or less, the coating solution collides with the roll accompanying the traveling of the strip member, causing the flow of winding up the particles settled in the vicinity of the strip member to weaken. Accordingly, when the traveling speed is 40 m/min or less, the significance of applying the present disclosure to suppress the adhesion of particles having a large particle size is enhanced. Therefore, the traveling speed is preferably 40 m/min or less, and more preferably 30 m/min or less. On the other hand, the slower the traveling speed, the larger the room for improvement. However, since the operation at a low speed causes a decrease in productivity, the traveling speed is preferably 5 m/min or more.

EXAMPLES

Example 1

Slurry application was performed on a steel strip (steel sheet) having a thickness of 0.3 mm and a width of 1200 mm using a roll coater as described above. The slurry was sprayed from the nozzle 2 onto the front and rear surfaces of the steel strip, and then the excess slurry was squeezed with the roll 3 and dried in a drying oven. The roll 3 had a diameter of 200 mm, and was made by lining a metal roll with urethane rubber (Shore A55°, thickness 20 mm). The roll pressing pressure was varied in the range of 10 kgf/m to 250 kgf/m (100 N/m to 2500 N/m) according to the coating weight. The roll 3 was rotated in the same direction at the same speed as traveling of the steel strip. The roll surface was subjected to V-groove processing with a width direction pitch of 0.1 mm and a depth of 0.05 mm. The nozzle 2 for slurry supply used was a cylindrical pipe having 6 mm φ round holes at a pitch of 100 mm in the width direction.

The slurry as the coating solution used was a mixture of water and magnesium oxide powder, and the magnesium oxide in the slurry was 15 mass %. The traveling speed was changed in the range of 10 m/min to 120 m/min. The sample sheet after the slurry application was dried, then the particle size of sintered particles and agglomerated particles (MgO coarse particles) of magnesium oxide adhering to the surfaces (front and rear surfaces) of the steel sheet was measured with a particle size measuring device, and the content of MgO coarse particles having a particles size of 10 μm or more in the steel sheet surfaces was determined.

Figure 4:
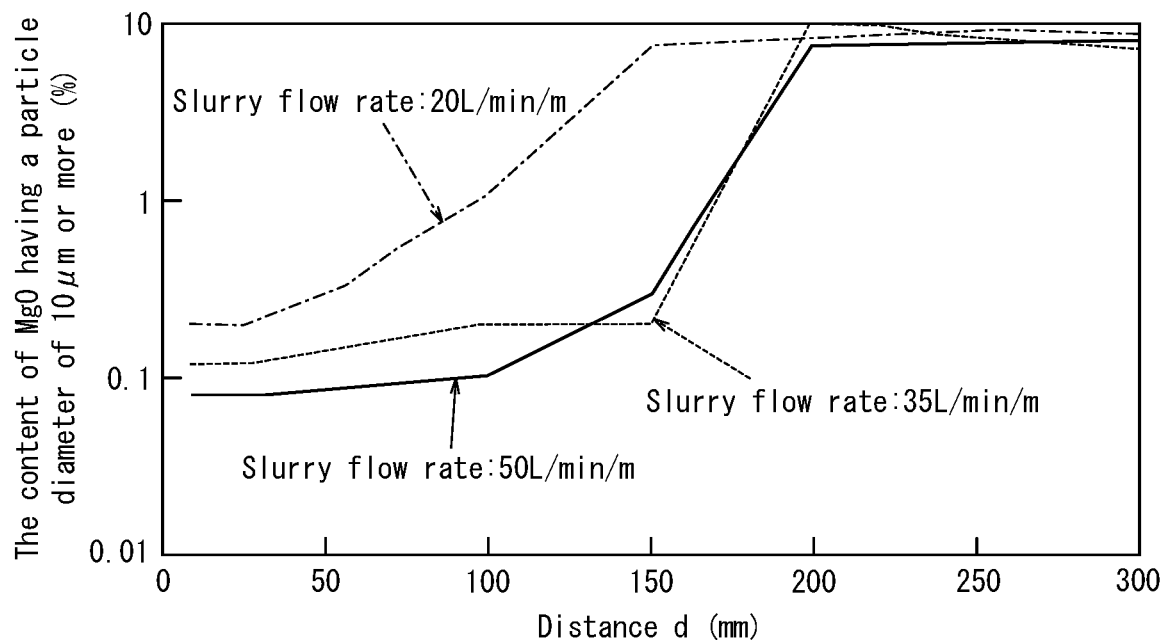
FIG. 4 is a graph illustrating the relationship between the content of MgO coarse particles and the distance d at various slurry flow rates.

FIG. 4 illustrates the content of MgO coarse particles having a particle size of 10 μm or more at the time of applying a slurry under a set of conditions including roll diameter: 200 mm, sheet passage speed: 10 m/min, spray angle θ: 20°, height h: 0 mm, distance d: 0 mm to 300 mm, and slurry flow rate: 20 L/min/m, 35 L/min/m, 50 L/min/m. By reducing the distance d, the content of MgO coarse particles having a particle diameter of 10 μm or more was reduced. By increasing the slurry flow rate, the content of coarse MgO particles having a particle diameter of 10 μm or more was reduced. However, when the distance d was 100 mm or less, the content of MgO coarse particles having a particle diameter of 10 μm or more was not significantly reduced even if the slurry flow rate was increased beyond 35 L/min/m.

Figure 5:
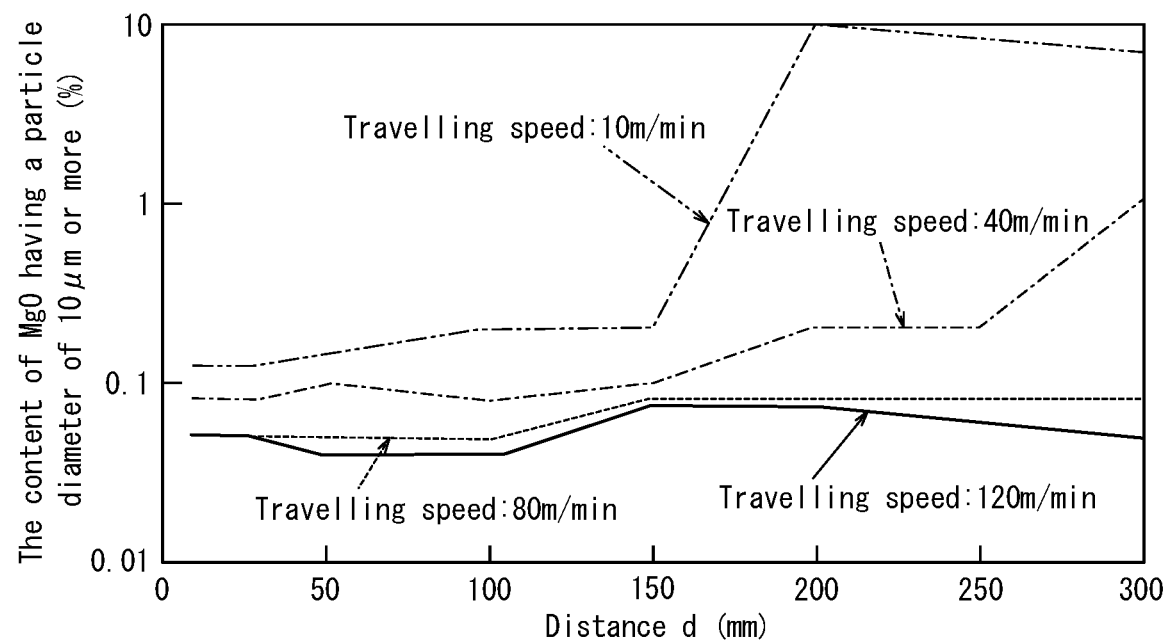
FIG. 5 is a graph illustrating the relationship between the content of MgO coarse particles and the distance d at various travelling speeds.

FIG. 5 illustrates the content of MgO coarse particles having a particle size of 10 μm or more at the time of applying a slurry under a set of conditions including roll diameter: 200 mm, traveling speed: 10 m/min, 40 m/min, 80 m/min, 120 m/min, spray angle θ: 20°, height h: 0 mm, distance d: 0 mm to 300 mm, and slurry flow rate: 35 L/min/m. As the sheet passage speed increased, the content of coarse MgO particles having a particle diameter of 10 μm or more decreased. At a sheet passage speed of 80 m/min or more, the content of MgO coarse particles was substantially constant regardless of the distance d.

Figure 6:
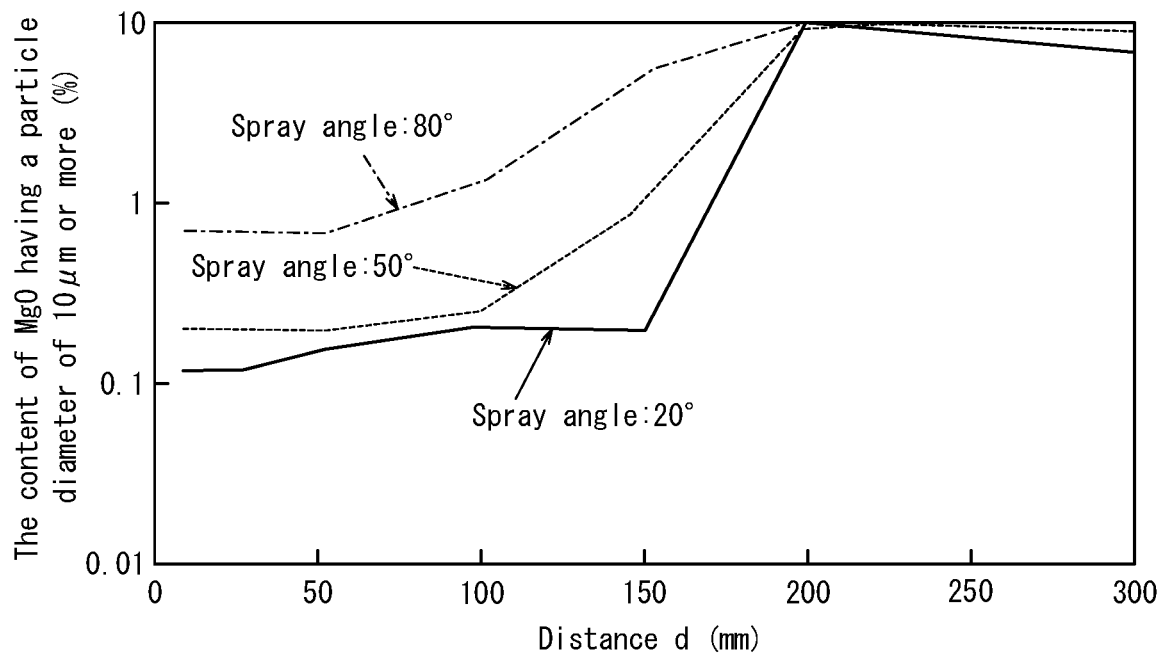
FIG. 6 is a graph illustrating the relationship between the content of MgO coarse particles and the distance d at various spray angles θ.

FIG. 6 illustrates the content of MgO coarse particles having a particle size of 10 μm or more at the time of applying a slurry under a set of conditions including roll diameter: 200 mm, traveling speed: 10 m/min, spray angle θ: 20°, 50°, 80°, height h: 0 mm, distance d: 0 mm to 300 mm, and slurry flow rate: 35 L/min/m. The content of coarse particles having a particle size of 10 μm or more decreased as the spray angle was shallow. However, from the slurry supply position to the distance d of 100 mm or less, the content of coarse particles having a particle diameter of 10 μm or more was not significantly reduced even if the spray angle was set to be shallower than 50°.

Figure 7:
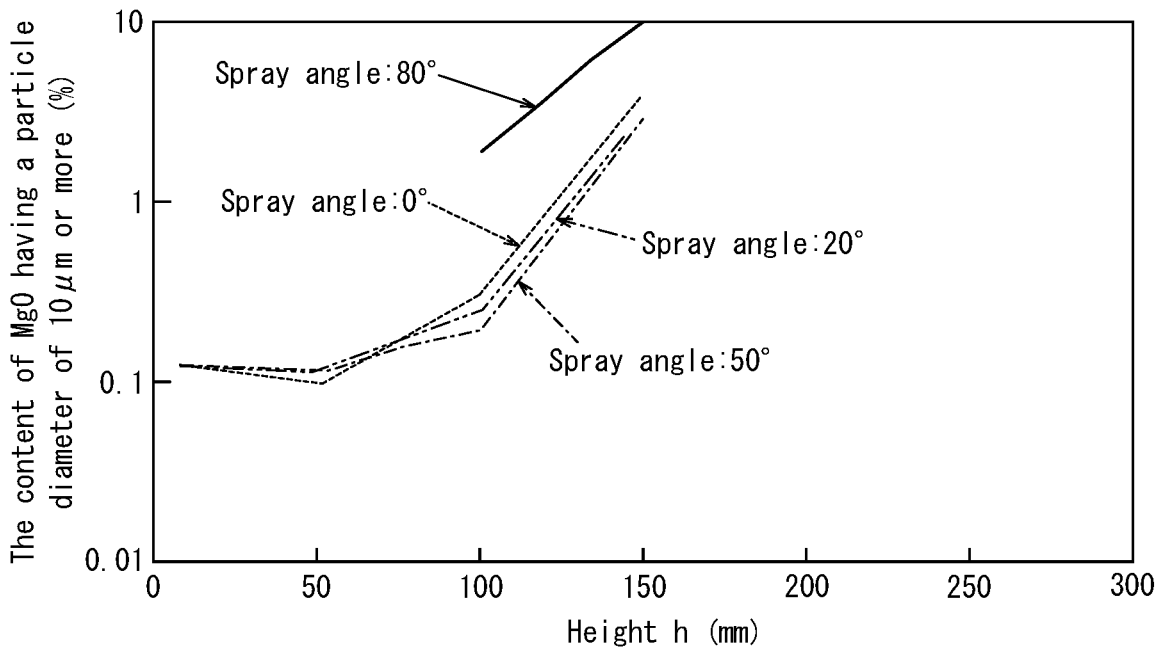
FIG. 7 is a graph illustrating the relationship between the content of MgO coarse particles and the height h at various spray angles θ.

FIG. 7 illustrates the content of MgO coarse particles having a particle size of 10 μm or more under a set of condition including roll diameter: 200 mm, sheet passage speed: 10 m/min, spray angle: 0°, 20°, 50°, 80°, height h: 10 mm, 50 mm, 100 mm, 150 mm, and slurry flow rate: 35 L/min/m. By setting the spray angle to 0° to 50°, the content of coarse particles having a particle size of 10 μm or more was reduced. When the spray angle was 80°, the content of coarse particles having a particle size of 10 μm or more was high even if the height h was 100 mm or less.

Although the steel strip was used as a strip member in the above example, the present disclosure is not necessarily limited to steel sheets, yet is applicable to other metal sheets such as aluminum sheets, paper sheets, or films. Also, the coating solution is not limited to magnesium oxide slurry.

REFERENCE SIGNS LIST

1 strip member
2 nozzle
3 roll (preceding role)
4 roll (succeeding roll)

The invention claimed is:

1. A slurry application method comprising: spraying a slurry from a nozzle onto one or both of a traveling strip member and a roll; and applying the slurry to a surface of the strip member by pressing the roll against the surface of the strip member, wherein
   a spray angle θ defined as an angle between a plane parallel to the strip member and a spray direction of the nozzle is set to 0° or more and 50° or less,
   a distance d in a conveyance direction of the strip member between an intersection point P1 and a rotation center P2 of the roll is 100 mm or less, the intersection point P1 being the closer to the nozzle of either an intersection point between a straight line extending in the spray direction of the nozzle and the surface of the strip member or an intersection point between the straight line extending in the spray direction of the nozzle and a surface of the roll, and
   a height h from the surface of the strip member to the intersection point P1 is ½ or less of a diameter of the roll.

2. The slurry application method according to claim 1, wherein a flow rate of the slurry per 1 m of a width of the strip member is 35 L/min/m or more.

3. The slurry application method according to claim 2, wherein a traveling speed of the strip member is 40 m/min or less.

4. The slurry application method according to claim 1, wherein a traveling speed of the strip member is 40 m/min or less.

5. A slurry application device which sprays a slurry from a nozzle onto one or both of a traveling strip member and a roll, and applies the slurry to a surface of the strip member by pressing the roll against the surface of the strip member, wherein
   a spray angle θ is 0° or more and 50° or less, the spray angle being defined as an angle formed by a plane parallel to the strip member and a spray direction of the nozzle,
   a distance d in a conveyance direction of the strip member between an intersection point P1 and a rotation center P2 of the roll is 100 mm or less, the intersection point P1 being the closer to the nozzle of either an intersection point between a straight line extending in the spray direction of the nozzle and the surface of the strip member or an intersection point between the straight line extending in the spray direction of the nozzle and a surface of the roll, and
   a height h from the surface of the strip member to the intersection point P1 is ½ or less of a diameter of the roll.

* * * * *